(12) United States Patent
Dougherty

(10) Patent No.: US 6,393,271 B1
(45) Date of Patent: May 21, 2002

(54) SYSTEM AND METHOD FOR WIRELINE BASED REGISTRATION OF WIRELESS DEVICE

(76) Inventor: Angus O. Dougherty, 11281 Ranch Pl., Westminster, CO (US) 80234

( * ) Notice: Subject to any disclaimer, the term of this patent is extended or adjusted under 35 U.S.C. 154(b) by 0 days.

(21) Appl. No.: 09/259,830

(22) Filed: Mar. 1, 1999

(51) Int. Cl.[7] .................................................. H04M 1/66
(52) U.S. Cl. ......................... 455/411; 455/456; 379/38; 340/825.49
(58) Field of Search ................................ 455/411, 456; 342/450, 465; 340/825.49

(56) References Cited

U.S. PATENT DOCUMENTS

| 5,363,425 | A | * | 11/1994 | Mufti et al. ................... 379/38 |
| 5,724,417 | A | * | 3/1998 | Bartholomew et al. ..... 379/211 |
| 5,742,237 | A | * | 4/1998 | Bledsoe ................... 340/825.49 |
| 5,774,876 | A | * | 6/1998 | Woolley et al. ............... 705/28 |
| 5,977,913 | A | * | 11/1999 | Christ .......................... 342/465 |
| 6,057,756 | A | * | 5/2000 | Engellenner ................. 340/505 |
| RE367,791 | | * | 7/2000 | Heller .......................... 342/450 |
| 6,216,000 | B1 | * | 4/2001 | Blumhardt ................... 455/435 |

* cited by examiner

Primary Examiner—Dwayne Bost
Assistant Examiner—Erika A Gary
(74) Attorney, Agent, or Firm—Townsend and Townsend and Crew LLP

(57) ABSTRACT

A wireline based location registration system for wireless devices includes a wireless device having a tag with a tag identity, and a terminal connected to a wireline loop that defines a terminal location for the terminal. The terminal receives a signal from the tag that indicates the tag identity. The terminal operatives to send a signal over the wireline loop that indicates the tag identity and the terminal location. An authentication center receives the signal from the terminal.

21 Claims, 2 Drawing Sheets

SYSTEM AND METHOD FOR WIRELINE BASED REGISTRATION OF WIRELESS DEVICE

TECHNICAL FIELD

The present invention relates to a system and method for wireline based registration of wireless devices.

BACKGROUND ART

In a wireless communication system, a personal communication service (PCS) system provides service to wireless devices that are in areas contained within cells or micro cells of the system. Although for any particular wireless device within the overall service area, the PCS can provide a communication path between the wireless device and a call destination, the PCS does not have the intelligence to determine the physical location of the wireless device. That is, location approximation technologies and techniques are generally not incorporated into the PCS. Existing location approximation technologies such as time-of-delivery and global positioning systems are complex in nature, and cannot be readily or easily incorporated into a PCS.

For the foregoing reasons, there is a need for a wireless communication system that overcomes the problems and limitations of the prior art.

DISCLOSURE OF THE INVENTION

It is, therefore, an object of the present invention to provide a system and method for wireline based registration of wireless devices.

In carring out the above object, a location registration system for wireless devices is provided. The system comprises a wireless device, a terminal, and an authentication center. The wireless device has a tag with a tag identity. The tag transmits a signal indicative of the tag identity. The terminal is connected to a wireline loop that defines a terminal location for the terminal. Further, the terminal is operative to receive the signal from the tag and further is operative to send a signal over the wireline loop that is indicative of the tag identity and the terminal location. The authentication center is in communication with the terminal, and receives the signals from the terminal.

In a preferred embodiment, the tag is in the form of a strip, and the wireless device includes a pair of power terminals. The strip is positioned to be in communication with the pair of power terminals to provide power to the strip for transmitting the signal indicative of the tag identity. The wireless device may be, for example, a wireless phone. Alternatively, the tag may be in another suitable form such as a microchip.

Further, in a preferred embodiment, the system includes a network configured to provide communication between the terminal and the authentication center. The network may include, for example, a circuit-switched network, a packet-switched network, or a local area network. Further, the system preferably includes a local switch connecting the wireline loop to the network.

Preferably, the wireless device has a device identity. The authentication center processes the tag identity to determine the device identity. As such, it is possible for the authentication center to determine the identity of a wireless device and the location of that wireless device, when the wireless device comes within range of the terminal. Preferably, the device identity includes an electronic serial number and a mobile identification number.

Further, in a preferred embodiment, the system includes a service location register. The authentication center communicates or registers the device identity with the service location register.

Further, in carrying out the present invention, a component for identifying a wireless device is provided. The component comprises a tag for placement on the wireless device. The tag has a tag identity, and is operative to transmit a signal indicative of the tag identity for reception by any one of a plurality of terminals. Each terminal is connected to a corresponding wireline loop defining a terminal location for that terminal. This allows a receiving terminal to send a signal indicative of the tag identity and the receiving terminal location over the wireline loop connected to the receiving terminal.

Preferably, the tag identity is a sequence of characters; and, the sequence has a length of between about 15 characters and about 28 characters. Further, the characters are preferably bar code characters that form a bar code inventory tag. Still further, preferably, the tag transmits the signal over a range having a radius that is between about 15 centimeters and about 20 centimeters.

Still further, in carrying out the present invention, a method for registering a wireless device is provided. Be method comprises transmitting a signal from a tag on a wireless device, receiving the signal at a terminal, sending a signal from the terminal over a wireline loop, and receiving the signal from the terminal at an authentication center.

The advantages associated with embodiments of the present invention are numerous. For example, systems and methods of the present invention allow the PCS carrier to locate wireless terminals to a specific wireline loop location. Unlike time of shivery, global positioning systems and other location approximation technologies and techniques, embodiments of the present invention provide systems and methods that allow the wireless device to be registed to a specific wireline loop location. Advantageously, suitable implementation of the authentication center allows the PCS carrier to place the tag on the wireless device and record the tag identity and corresponding device identity at the authentication center such that the information is readily available to register the location of the wireless device during later use by an end user.

There are many benefits that may be achieved with the embodiments of the present invention. For example, the authentication center may be used to determine a specific wireline loop location for a wireless device when the wireless device places an emergency call such as a call to the police, fire department, or any other emergency call such as 911 calls where such service, is available.

The above object and other objects, features, and advantages of the present invention are readily apparent from the following detailed description of the best mode for carring out the invention when taken in connection with the accompanying drawings.

BEST MODE FOR CARRYING OUT THE INVENTION

Figure 1:
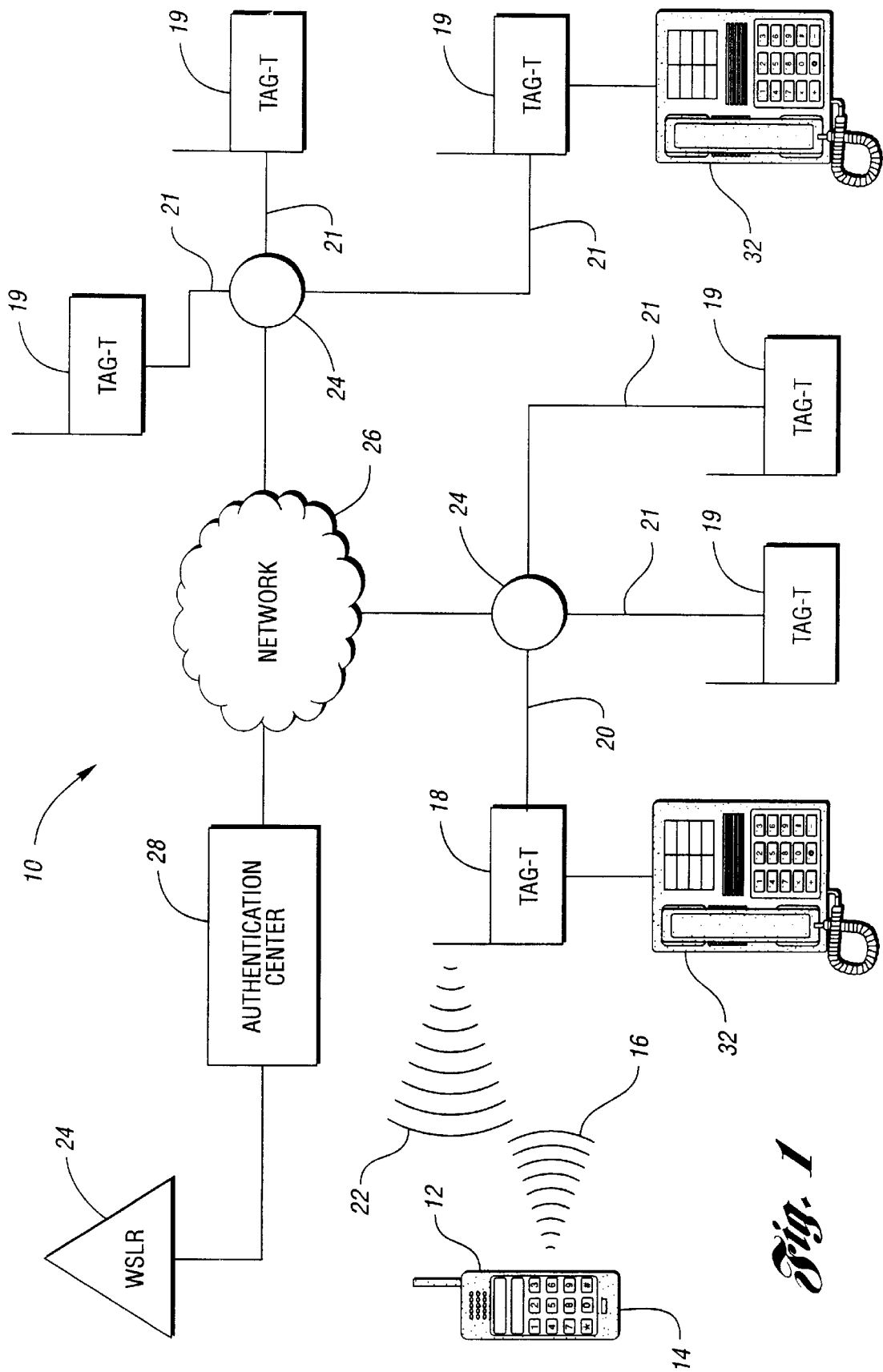
FIG. 1 is a location registration system of the present invention for wireline based registration of wireless devices.

With reference to FIG. 1, a system of the present invention for dynamic location registration is generally indicated at 10. System 10 includes a wireless device 12 having a tag 14. Tag 14 has a tag identity. Tag 14 transmits a signal 16 indicative of the tag identity. A terminal 18 is connected to a wireline loop 20. Wireline loop 20 defines the terminal location. That is, in order to more greatly appreciate the advantages of the embodiments of the present invention, system 10 preferably includes additional terminals 19, with each terminal connected to a corresponding wireline loop 21. As such, a plurality of wireline loops may cover a wide geographical area with individual terminals located throughout the area. In this way, wireless device 12 may be moved throughout the entire area of coverage, moving into and out of range with different terminals of the system. Terminal 18 operates as a receiver over a range 22. An appropriate range for terminal 18 is based on a variety of factors including the spacing of different terminals from each other.

It is to be appreciated that the term "wireless device" as used herein is meant to include any device that receives a tag. That is, a device is wireless in that the device does not have a permanent physical connection to a terminal. That is, although wireless communication device such as wireless phones are used in one suitable implementation, the term "wireless device" is intended to be far reaching. For example, a laptop computer and personal organizer are both possible "wireless devices". Further, for example, even a vehicle such as a truck my be tagged, making the truck a wireless device to allow location tracking thereof. The examples above are illustrative only, and the term "wireless device" shall be interpreted to encompass any device receiving a tag and lacking a permanent physical connection to a terminal. Of course, as described later herein, the wireless device preferably has a battery that provides power for the tag when the tag is placed between points of sufficient difference in potential, such as the battery terminals. In a laptop embodiment, the tag may be connect to the laptop via a Personal Computer Memory Card International Association (PCMCIA) slot or other suitable expansion slot that is present.

Wireline loop 20, and any other wireline loops 21 are preferably routed through local switches 24 to a network 26. Network 26 allows signal receiving terminal 18 to communicate with an authentication center 28.

Terminal 18 is operative to receive signal 16 from tag 14 and in response, send a signal over wireline loop 20 through switch 24 and network 26 to authentication center 28. The signal from terminal 18 is indicative of the tag identity and of the terminal location as defined by the specific wireline loop 20. As such, the information received at authentication center 28 tells authentication center 28 the tag identity for wireless device 12 (that is, which device is present) and the terminal location of terminal 18 (that is, where wireless device 12 is at).

Of course, it is to be appreciated, that it is only neccessary that textual 18 and any other terminal 19 be in communication with authentication center 28 to allow the sending of the tag identity and terminal location from terminal 18 (or any other terminal 19) to authecaon center 28. As such, network 26 may include, for example, a circuit-switched network, a packet-switched network, or a local area network. Further, a circuit-switched network may include the public switched telephone network (PSTN). Still further, a packet of switched network may include an Internet protocol network such as a transmission control protocol/Internet protocol (TCP/IP) network. Even Thrice, a local area network may include a network extending through a building or building complex with the wireline loop drops located at various locations in he building or complex such as at elevators, conference rooms, etc. Of course, it is to be appreciated that any of the above-named network types or any other networks, alone or in combination, May be suitable for applications of the present invention.

In a preferred embodiment, authentication center 28 determines a device identity that corresponds to the tag identity received with the terminal location. In such an embodiment, the tag identity and device identity are preferably cataloged together at the authentication center when tag 14 is put on device 12. As such, when authentication center 28 receives the tag identity (and terminal location), the tag identity can be matched up with the corresponding device. Preferably, the device identity includes an electronic serial number and/or a mobile identification number. By configuring authentication center 28 to determine device identities that correspond to the tag identities, implementation of embodiments of the present invention is facilitated. That is, a distributor may receive wireless devices 12 after a permanent serial number has been assigned to each wireless device. Further, the distributor may assign further identification to the device such as a mobile identification number that is preferable the same as the telephone number when the device is a phone. Still futher, a distributor may simply have a large mass produced collection of tags. Implementation of authentication center 28 allows any tag to be selected and applied to any wireless device 12, and then a record is made of the tag identity and corresponding device identifiers (electric serial number and/or mobile identification number) at authentication center 28. Later, when authentication center 28 receives the tag identity and terminal 18 location, authentication center 28 may readily and easily determine the device identity of the wireless device based on the tag identity, and may determine which terminal that wireless device is located at based on the terminal identity as defined by wireline loop location.

It is to be appreciated that teals 18 and 19 may be located anywhere that a wireline drop is present. Of course, it is possible, that telephones 32 or other devices are located at these wireline drops, but it is to be appreciated that this is not required. As such, it is to be appreciated that terminals 18 and 19 may be located at any wireline drop, such as, for example, at traffic lights, or wiring in a building or other structure, such as street lights. Preferably, authentication center 28 communicates or registers device identity and location at a service location register such as a wireless service location register (WSLR) 34. Of course, WSLR 34 may include authentication center 28 or may be separated therefrom.

Figure 2:
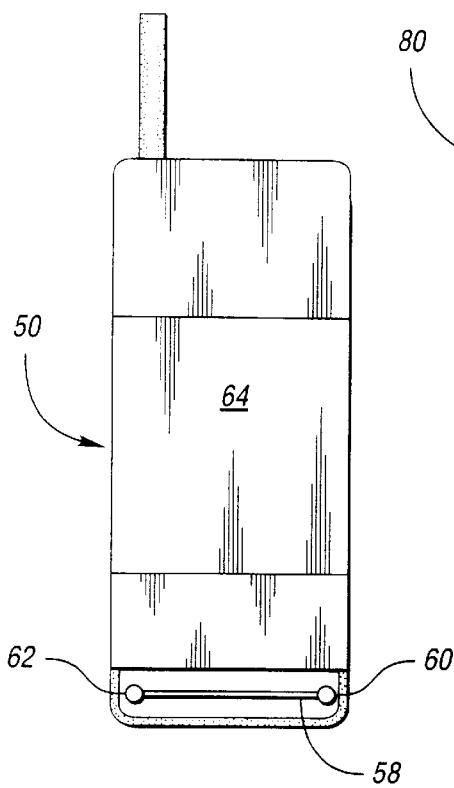
FIG. 2 is a wireless device having a strip-type tag extending between power terminals for transmitting the tag ident m accordance with the present invention.
Figure 3:
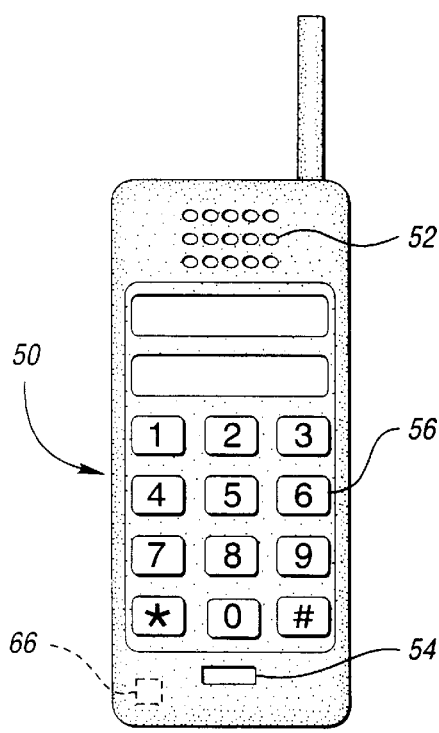
FIG. 3 is a wireless device having a microchip tag in accordance with an alternative embodiment of the present invention.

With reference to FIGS. 2 and 3, a wireless device having a tag in accordance with the present invention is generally indicated at 50. Wireless device 50 is a wireless telephone; but, of course, it is appreciated that other devices may be tagged. Wireless device 50 includes speaker 52 and microphone 54. Further, keypad 56 allows a user to dial out. As shown in FIG. 2, a tag 58 preferably is in the form of a strip. In a preferred embodiment, tag 58 is an active transmitter and is positioned across a pair of battery terminals 60 and 62. A battery 64 has the primary purpose of powering wireless device 50. Tag 58 is preferably configured to always draw power from battery 64. However, power drawn by tag 58 is preferably almost negligible relative to the amount of power required to operate wireless device 50. This is preferred to reduce the effects of tag 58 on the useful life of device 50 on a full-charged battery. As mentioned previously, in an alternative to tag 58 (FIG. 2), as shown in FIG. 3, a microchip 66 may be used to transmit the tag identity. Of course, it is to be appreciated that tag 58 is the current preferred embodiment of the present invention due to the lower cost and easier implementation thereof.

Figure 4:
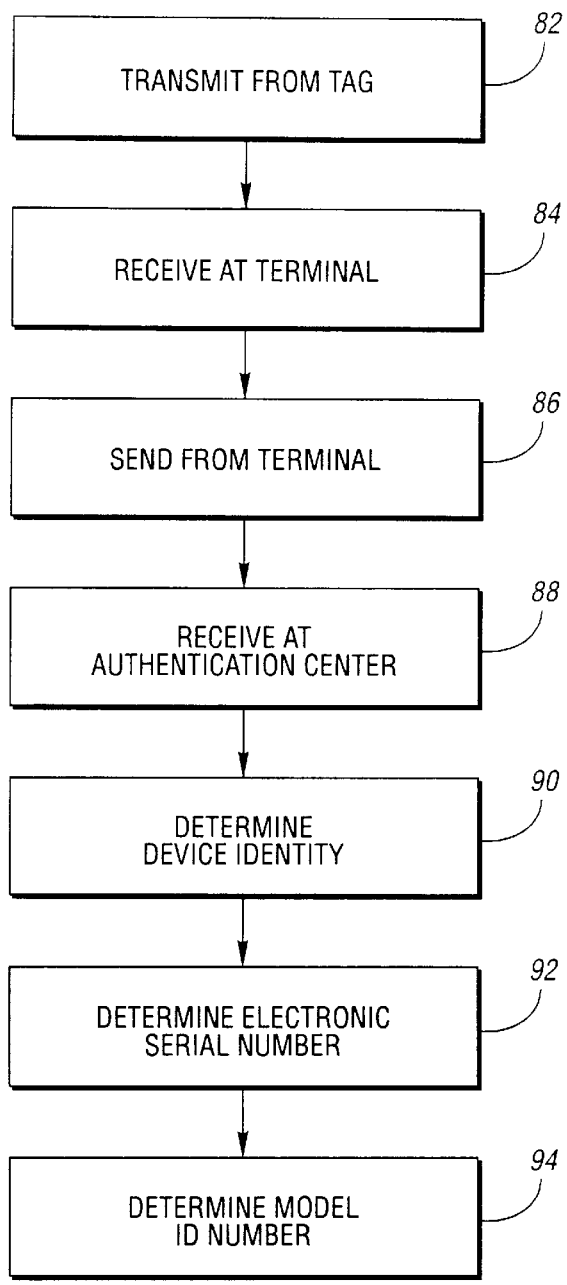
FIG. 4 is a block diagram illustrating a method of the present invention.

Referring to FIG. 4, a method of the present invention for dynamically registering a wireless device location to a specific wireline loop location (or the location) is generally indicated at 80. At block 82, the tag transmits the tag identity for reception by a nearby terminal (preferably of a plality of terminals). At block 84, a terminal receives the tag identity. At block 86, the receiving terminal sends a signal over the wireline loop to an authentication center. The signal sent by the terminal indicates the tag identity and fiber indicates the terminal location. At block 88, the authentication center receives the sent information. At block 90, the authentication center determines device identity based on the tag identify, and advantageously notes the location of the wireless device based on the terminal location. As such, the specific wireless device and its specific location at a specific wireline loop of a potentially large network having many wireline loop drops is determined.

It is to be appreciated that the device identity as determined by the authentication center may include specific device identification items. For example, at block 92, the electronic serial number of the tagged wireless device is detention by examining the tag identity received at the authentication center. Further, at block 94, the mobile identification number corresponding to the wireless device sending the tag identity is determined at the authentication center by examining the tag identity received.

In one suitable bilementation the tag at the signal indicating tag identity over a range having a radius between about 15 centimeters and about 20 centimeters. Further, in a suitable implementation, the tag identity is a message that is a sequence of characters having a length of about 15 to about 28 characters. The characters are preferably bar code characters that form a bar code inventory tag. Further, a suitable bar code tag way be a metallic inventory strip. Further, in one suitable implementation, the tag draws about 7 milliamps of current from the battery of the wireless device. Still further, in a suitable implementation, the terminal broadcasting antenna draws about 50 milliamps of current and has a range of about 3 meters in radius.

Additionally, in embodiments wherein some or all of the terminals have telephones or other communication devices connected to them, it is preferred that the tag and the terminal comnunicate with each other over a bandwidth that is outside of the bandwidth used for the telephones or other devices. As such, in a preferred implementation, the terminal and tag can communicate with each other while the telephone or other device is in use. Of course, in some applications it may be appropriate to share the same bandwidth, and if desired, use appropriate techniques to allow sinmltaneous use of the bandwidth by the telephone and the terminal.

While embodiments of the invention have been illustrated and described, it is not Fin ed that these embodiments illustrate and describe all possible forms of the invention. Rather, the words used in the specification are words of description rather than limitation, and that various changes may be made without departing from the spit and scope of the invention.

What is claimed is:

1. For use with a wireless communication network and a wireline communication network, the wireless communication network including a personal communication service system that provides a communication path between a wireless device and a call destination without determining a physical location of the wireless device, a location registration system for wireless devices, the system comprising:

a wireless device configured to use the personal communication service system of the wireless communication network, the wireless device having a tag with a tag identity, the tag transmitting a signal indicative of the tag identity;

a terminal connected to a wireline loop of the wireline communication network, the loop defming a terminal location on the wireline communication network for the terminal, the terminal being operative to receive the signal from the tag and further being operative to send a signal over the wireline loop that is indicative of the tag identity and the terminal location;

an authentication center in communication with the terminal, the authentication center receiving the signal from the terminal; and a service location register on the wireless communication network, the service location register receiving a signal indicative of the tag identity and terminal location from the authentication center thereby providing the wireless communication network with the physical location of the wireless device based on the terminal location.

2. The system of claim 1 wherein the tag is in the form of a strip.

3. The system of claim 2 wherein the wireless device further comprises:

a pair of power termninals, wherein the strip is positioned to be in communication with the pair of power terminals to provide power to the strip for transmitting the signal indicative of the tag identity.

4. The system of claim 1 wherein the wireless device is a wireless phone.

5. The system of claim 1 further comprising:

a network configured to provide communication between the terminal and the authentication center.

6. The system of claim 5 further comprising:

a local switch connecting the wireline loop to the network.

7. The system of claim 5 wherein the network includes a circuit-switched network.

8. The system of claim 5 wherein the network includes a packet-switched network.

9. The system of claim 5 wherein the network includes a local area network.

10. The system of claim 1 wherein the wireless device has a device identity, and wherein the authentication center processes the tag identity to determine the device identity.

11. The system of claim 10 wherein the device identity includes an electronic serial number.

12. The system of claim 10 wherein the device identity includes a mobile identification number.

13. The system of claim 10 wherein the authentication center communicates the device identity to the service location register.

14. The system of claim 1 wherein the tag is a microchip.

15. The system of claim 1 wherein the tag identity is a sequence of characters, the sequence having a length between 15 characters and 28 characters.

16. The system of claim 15 wherein the characters are bar code characters forming a bar code inventory tag.

17. The system of claim 1 wherein the tag transmits the signal over a range having a radius that is between 15 centimeters and 20 centimeters.

18. A method for registering a wireless device, the method comprising:
- transmitting a signal from a tag on a wireless device, the tag having a tag identity and the signal being indicative of the tag identity;
- receiving the signal from the tag at a terminal connected to a wireline loop defining a terminal location;
- sending a signal from the terminal over the wireline loop, the signal from the terminal being indicative of the tag identity and the terminal location;
- receiving the signal from the terminal at an authentication center in communication with the terminal; and
- sending a signal from the authentication center to a service location register that indicates the tag identity and terminal location.

19. The method of claim 18 wherein the wireless device has a device identity, and the method further comprises:
- determining the device identity by processing the tag identity at the authentication center.

20. The method of claim 19 wherein the device identity includes an electronic serial number.

21. The method of claim 19 wherein the device identity includes a mobile identification number.

* * * * *